United States Patent [19]

Taniguchi et al.

[11] Patent Number: 4,890,515

[45] Date of Patent: Jan. 2, 1990

[54] SYSTEM FOR INTEGRALLY CONTROLLING AUTOMATIC TRANSMISSION AND ENGINE

[75] Inventors: Hiroji Taniguchi; Kunihiro Iwatsuki, both of Toyota, Japan

[73] Assignee: Toyota Jidosha Kabushiki Kaisha, Japan

[21] Appl. No.: 68,210

[22] Filed: Jun. 30, 1987

[30] Foreign Application Priority Data

Jul. 7, 1986 [JP] Japan .................................. 61-159401

[51] Int. Cl.$^4$ ............................................. B60K 41/06
[52] U.S. Cl. ........................................ 74/866; 74/861; 74/867; 74/872
[58] Field of Search .................. 74/861, 843, 853, 857, 74/863, 867, 866, 868, 874, 752 A, 752 C, 872

[56] References Cited

U.S. PATENT DOCUMENTS

| | | | |
|---|---|---|---|
| 3,726,159 | 4/1973 | Mizote | 74/866 |
| 3,827,315 | 8/1974 | Lupo | 74/863 |
| 4,208,929 | 6/1980 | Heino et al. | 74/866 X |
| 4,259,882 | 4/1981 | Miller | 74/866 X |
| 4,266,447 | 5/1981 | Heess et al. | 74/866 X |
| 4,355,550 | 10/1982 | Will et al. | 74/866 X |
| 4,367,528 | 1/1983 | Kawamoto et al. | 74/866 X |
| 4,370,903 | 2/1983 | Stroh et al. | 74/866 X |
| 4,403,527 | 9/1983 | Mohl et al. | 74/866 X |
| 4,485,443 | 11/1984 | Knodler et al. | 74/843 X |
| 4,543,934 | 10/1985 | Morita et al. | 123/435 |
| 4,584,905 | 4/1986 | Eschrich et al. | 74/866 X |
| 4,594,669 | 6/1986 | Hosaka | 74/857 X |
| 4,667,540 | 5/1987 | Yagi | 74/866 |
| 4,722,250 | 2/1988 | Sumiya et al. | 74/867 |
| 4,770,064 | 9/1988 | Kuerschner | 74/867 X |

FOREIGN PATENT DOCUMENTS

| | | |
|---|---|---|
| 0227001 | 12/1984 | European Pat. Off. . |
| 0130811 | 1/1985 | European Pat. Off. . |
| 5569738 | 6/1980 | Japan . |
| 2042658 | 9/1980 | United Kingdom . |
| 2156017 | 10/1985 | United Kingdom . |

Primary Examiner—Dwight G. Diehl
Attorney, Agent, or Firm—Oliff & Berridgeg

[57] ABSTRACT

In a system for integrally controlling an automatic transmission and an engine, wherein hydraulic control devices are operated and engagement of frictionally engaging devices are selectively switched, to thereby achieve a shifting, and an engine torque is changed during shifting, a rate of change with time of oil pressure supplied to the frictionally engaging devices is temporarily reduced in association with the completion of the engine torque change. With this arrangement, rise of an output shaft torque generated at the time of completion of the engine torque change can be controlled, so that satisfactory shift characteristics can be obtained.

11 Claims, 9 Drawing Sheets

FIG. 3

| SHIFT POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| | 2 | ○ | | ○ | | ○ | | | ◎ | | ◎ |
| | 3 | ○ | ○ | ○ | | ○ | | | | | ◎ |
| | 4 | ○ | ○ | | | ○ | | ○ | | | |
| 2 | 1 | ○ | | ○ | | | | | | ◎ | ◎ |
| | 2 | ○ | | ○ | ○ | ○ | | | ◎ | | ◎ |
| | 3 | ○ | ○ | ○ | | ○ | | | | | ◎ |
| L | 1 | ○ | | ○ | | ○ | | | | ◎ | ◎ |
| | 2 | ○ | | ○ | ○ | ○ | | | ◎ | | ◎ |

FIG. 5

| θ | 1→2 | | | | 2→3 | | | | 3→4 | | | |
|---|---|---|---|---|---|---|---|---|---|---|---|---|
| | rpm $N_1$ | $T_2$ | $T_3$ | TIMES $K_0$ | $N_1$ | $T_2$ | $T_3$ | $K_0$ | $N_1$ | $T_2$ | $T_3$ | $K_0$ |
| $θ_7$ | 1000 | 0.1 | 0.05 | 2 | 800 | 0.12 | 0.06 | 2 | 800 | 0.1 | 0.05 | 3 |
| $θ_6$ | 800 | ↑ | ↑ | 3 | 600 | ↑ | ↑ | 2 | 600 | ↑ | ↑ | 3 |
| $θ_5$ | 650 | 0.12 | 0.06 | ↑ | 500 | | | 3 | 500 | | | 3 |
| $θ_4$ | 500 | ↑ | ↑ | 0 | ↑ | | | 0 | ↑ | | | 0 |
| $θ_3$ | ↑ | | | ↑ | | | | ↑ | | | | ↑ |
| $θ_2$ | | | | | | | | | | | | |
| $θ_1$ | | | | | | | | | | | | |
| $θ_0$ | | | | | | | | | | | | |

SYSTEM FOR INTEGRALLY CONTROLLING AUTOMATIC TRANSMISSION AND ENGINE

BACKGROUND OF THE INVENTION

This invention relates to a system for integrally controlling an automatic transmission and an engine.

Automatic transmissions for vehicles, having gear shift mechanisms, a plurality of frictionally engaging devices, and hydraulic control devices operated to selectively switch the engagements of the frictionally engaging devices, so that any one of a plurality of gear stages can be achieved are well known in the transmission art.

In the automatic transmission as described above, to reduce the shift shocks thereof, an accumulator is provided in oil lines leading to the frictionally engaging devices.

When pressure is fed anew, this accumulator forms a so-called oil pool in the oil line, so that a region where oil pressure acting on the frictionally engaging devices does not rise sharply, can be created.

In general, in order to decrease a rate of change with time of an output shaft torque as much as possible, it is preferable to constantly or gradually decrease supplied oil pressure when the frictionally engaging devices are engaged. For example, in the case where the frictionally engaging devices are clutches, since rotation is started simultaneously with the start of engagements, centrifugal oil pressure is generated. Since this centrifugal oil pressure is applied to the actually supplied oil pressure, it is preferable that the supplied oil pressure itself be gradually decreased, accordingly.

However, the oil pressure characteristics obtained by the conventional accumulator present such a problem that the freedom of design is very small due to the construction of the accumulator. In oil pressure control using an accumulator, for example, along with the movement of an accumulator piston, oil pressure cannot help but be increased by a value of the increased load of a spring attached to the aforesaid accumulator piston. When this rate of increase is to be lowered as much as possible, a spring constant of a spring attached to the accumulator piston is lowered in general. However, there are many cases where the spring constant cannot be desirably lowered due to restrictions including loads needed at the beginning and end of movement of this accumulator piston, the size of the accumulator, the quality of the spring material and the like.

Further, since the accumulator forms the so-called oil pool to hold oil pressure constant, the accumulator needs a considerable volume itself, in general. Thus it is an obstacle to reduce the automatic transmission in size.

To obviate the above-described disadvantages of the prior art, the applicant has provided, in Japanese patent application Ser. No. 287383/85 (not laid open yet), a shift control device of an automatic transmission in a vehicle, wherein, the accumulator is more compact in size, and moreover, shift shocks are reduced further, so that improved shift smoothness can be obtained. Therein is provided a device capable of desirably controlling a rate of change with time of oil pressure supplied to the frictionally engaging devices, wherein a predetermined time during shifting is detected, and the rate of change with time of the oil pressure supplied to the frictionally engaging devices is changed and controlled from this predetermined time. As a result, an oil pressure operating upon the frictionally engaging devices during shifting (this oil pressure being commensurate to the torque transmitting force in the frictionally engaging devices) can be controlled to minimize the shift shocks.

SUMMARY OF THE INVENTION

The present invention has been developed to obviate the above-described disadvantages and has as its object the provision of a system for integrally controlling an automatic transmission and an engine, wherein the oil pressure control technique disclosed in the aforesaid patent application Ser. No. 287383/85 is applied to a special shifting control scheme for changing engine torque during shifting, so that reduction in shift shocks by performing engine torque change is further improved.

To achieve the above-described object, the present invention contemplates a system for integrally controlling an automatic transission and an engine, wherein a hydraulic control device is operated to selectively switch engagements of the frictionally engaging devices to achieve shifting, and engine torque is changed during this shifting. As the technical gist is shown in FIG. 1, the present invention includes means for changing and controlling a rate of change with time of oil pressure supplied to the frictionally engaging devices and means for temporarily decreasing the rate of change with time of oil pressure supplied to the frictionally engaging devices in relation to the time of completion of the engine torque change.

Various proposals of systems for integrally controlling an automatic transmission and an engine, wherein engine torque is changed during shifting have been made (Japanese Patent Laid-Open No. 69738/80, for example). When engine torque is changed during shifting, the amount of energy absorbed in various members of the automatic transmission or in the frictionally engaging devices for braking these members can be reduced, so that the shifting can be completed within a short time duration, with low shift shocks.

However, there occurs such a problem that, when engine torque change control is carried out during upshifting under acceleration for example, output shaft torque is raised simultaneously with the completion of the engine torque change control in the end of shifting. This will be described with reference to FIG. 8. In FIG. 8, output shaft torque To during shifting will be represented by the following equation.

$$T_o = (1+\rho_F)T_E - (1+\rho_F)(I_e+I_i)d\omega e \qquad (1)$$

where $\rho_F$ is a ratio of numbers of teeth of a planetary gear unit on the front side of the automatic transmission (sun gear 931/ring gear 937 in an embodiment to be described hereunder), $T_e$ is engine torque, $I_e+I_i$ are inertias of the engine, torque converter and input system, and $d\omega e$ is a change in rotary speed of the engine.

As apparent from the above equation, the output shaft torque To can be divided into a term $(1+\rho_F)T_E$ relating to the engine torque and a term $-(1+\rho_F)(I_e+I_i)d\omega e$ relating to the inertia torque. When an engine torque down command is outputted, a decreased value of the term $(1+\rho_F)T_E$ of the engine torque due to the torque down becomes larger than the increased value of the term $-(1+\rho_F)(I_e+I_d)d\omega e$ of the inertia torque due to shortened shift duration, whereby the output shaft torque To is lowered. Then, when an engine torque return command is outputted, the output shaft torque rises again (refer to a solid line in FIG. 6). According to the present invention, in order to prevent the output shaft torque from rising mainly due to this reason, engagement oil pressure of the frictionally engaging devices is adapted to decrease in association with the engine torque return. A timing for decreasing the engagement oil pressure can be determined as the same time as the torque return command, or by a timer as some time following the torque return command. When a time delay exists during lowering of the engagement oil pressure, as soon as an engagement oil pressure lowering command is outputted, the engine torque return command may be outputted, or the engine torque return command may be outputted by a timer from the engagement oil pressure lowering command. In this case, as a condition for lowering the engagement oil pressure, the same condition as that for the conventional engine torque return can be used. For example, the following formula can be used.

$$NCo \leq No \times I_H = N2$$

where NCo is a rotary speed of a clutch Co to be described hereunder, $I_H$ is a gear ratio on the side of high gear stages, and N2 is a constant preset in accordance with the throttle opening, shift pattern, ON-OFF of the lockup clutch and the like. This value N2 may preferably be made a little larger than the value N1 used on the conventional engine torque return condition. The values of the timers may be suitably changed or set in accordance with these factors.

In a preferred embodiment of the present invention, the aforesaid change-control means is a means adapted to temporarily return a shift valve associated with the shifting to the side of the preceding gear stage at least once. With this embodiment, the change and control of the timer values can be carried out without changing a hard system of the conventional hydraulic control devices.

In another preferred embodiment of the present invention, the aforesaid change-control means is a means adapted to change and control the back pressure of the accumulator positioned in the oil line leading to the frictionally engaging devices. With this embodiment, the supplied oil pressure (dependent on the back pressure) can be desirably and properly changed.

In a further preferred embodiment of the present invention, the aforesaid change-control means is a means adapted to duty-control the line oil pressure.

In a still further preferred embodiment of the present invention, the aforesaid change-control means is a means adapted to electromagnetic-proportion-valve-control the line oil pressure.

Incidentally, well-known means can be adopted for carrying out the duty-control and the electromagnetic-proportion-valve-control. In this case, in the hydraulic control devices having such an arrangement that the line oil pressure is applied to a back pressure chamber of the accumulator as the back pressure of the accumulator, the back pressure of the accumulator can be changed and controlled simultaneously by controlling the line oil pressure.

In another still further preferred embodiment of the present invention, the aforesaid change-control means is a means adapted to duty-control the oil pressure supplied to the frictionally engaging devices after passing through the shift valve.

In a yet further preferred embodiment of the present invention, the aforesaid change-control means is a means adapted to electromagnetic-proportion-valve-control the oil pressure supplied to the frictionally engaging devices after passing through the shift valve.

As described above, the oil pressure to be changed and controlled may be the so-called line oil pressure (including the case where any other oil pressure becomes the line oil pressure as a result). Furthermore, the oil pressure may be the oil pressure supplied to the frictionally engaging devices after passing through the shift valve.

BRIEF DESCRIPTION OF THE DRAWINGS

The above objects, features and advantages of the present invention, as well as other objects and advantages thereof, will become more apparent from the description of the invention which follows, taken in conjunction with the accompanying drawings, wherein like reference characters designate a same or similar parts and wherein:

FIG. 3 is a chart showing the operating conditions of the frictionally engaging devices in the above automatic transmission;

FIG. 5 is a chart showing examples of maps of various constants;

DETAILED DESCRIPTION OF THE PREFERRED EMBODIMENT

The embodiments of the present invention will be described in detail with reference to the accompanying drawings.

Figure 1:
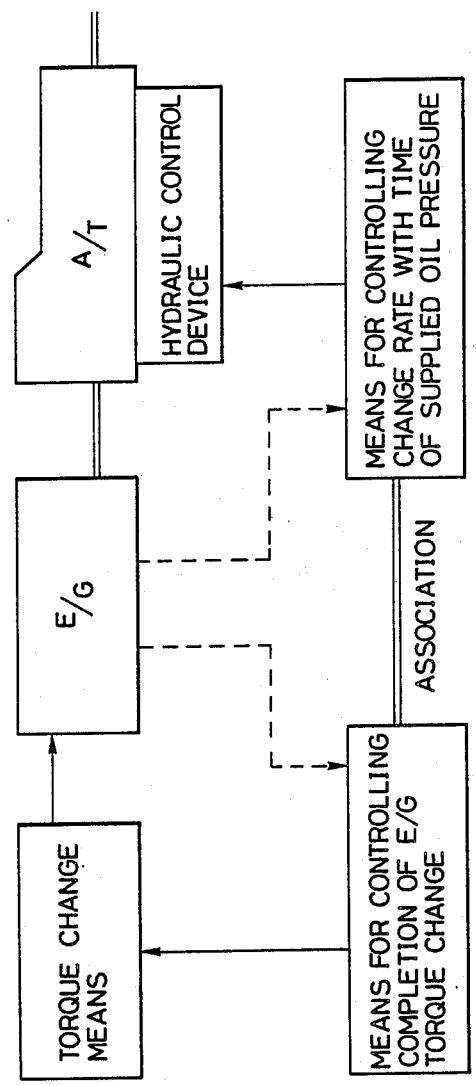
FIG. 1 is a block diagram showing the technical illustration of the present invention.
Figure 2:
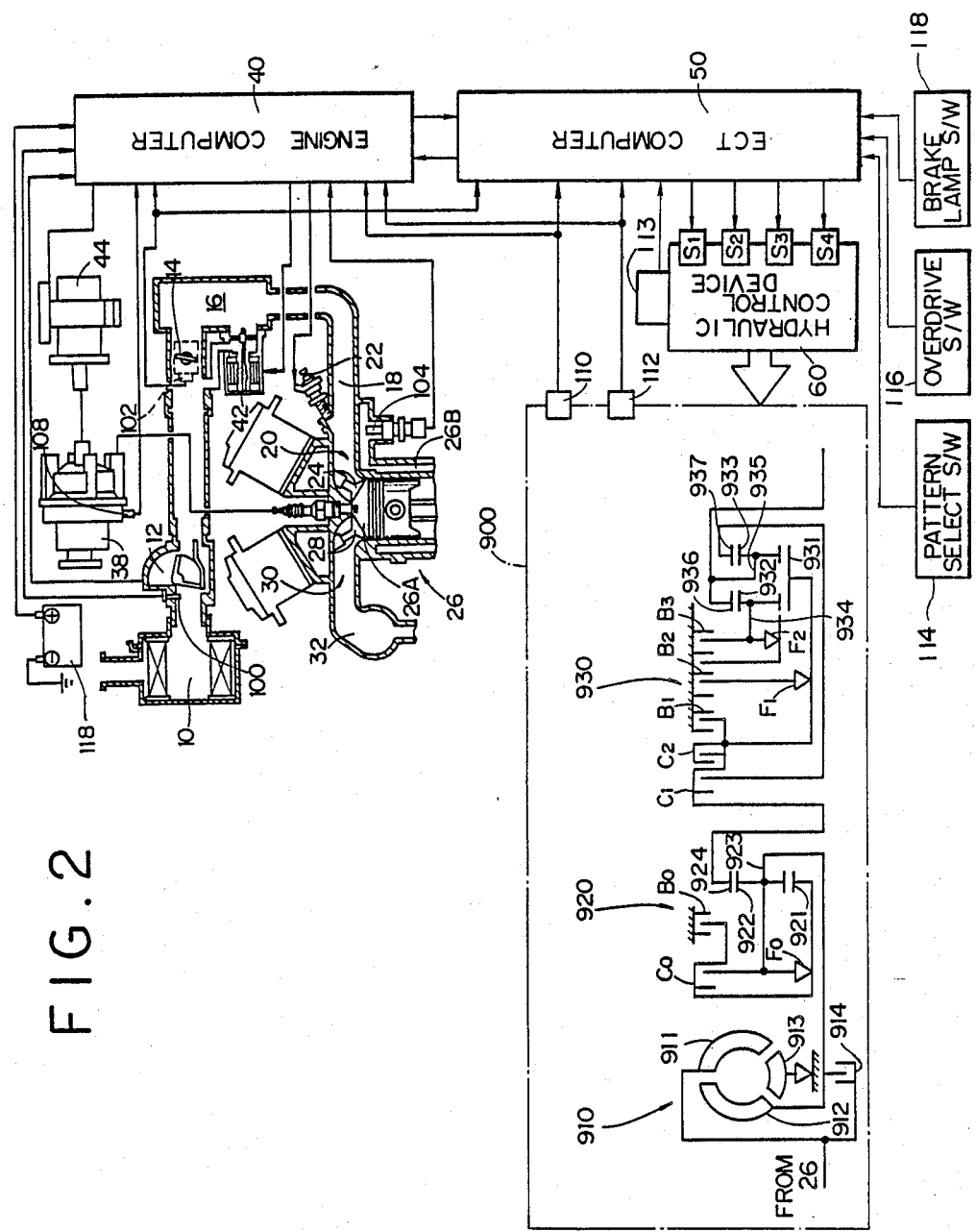
FIG. 2 is a skeleton diagram generally showing the system for integrally controlling an automatic transmission and an engine, to which is applied a first embodiment of the present invention.

FIG. 2 is the general arrangement drawing showing the automatic transmission combined with the intake-air quantity sensing type electronic fuel injection engine (hereinafter referred to as "ECT"), to which present invention is applied.

Air taken into an air cleaner 10 is successively delivered to an air flow meter 12, an intake throttle valve 14, a surge tank 16 and an intake manifold 18. This air is mixed with fuel injected from an injector 22 in the proximity of an intake port, and further, delivered to a combustion chamber 26A of a main body 26 of the engine through an intake valve 24. The exhaust gas produced due to the combustion of an air-fuel mixture in the combustion chamber 26A is exhausted to the atmosphere through an exhaust valve 28, an exhaust port 30, an exhaust manifold 32 and an exhaust pipe (not shown).

An intake-air temperature sensor 100 for detecting intake air temperature is provided in the air flow meter 12. The intake throttle valve 14, rotates in operational association with an accelerator pedal (not shown), which is provided near a driver's seat in the vehicle. A throttle sensor 102 is provided at the intake throttle valve 14, for detecting a throttle opening thereof. A water temperature sensor 104 is provided in a cylinder block 26B of the main body 26 of the engine, for detecting an engine cooling water temperature. A crank angle sensor 108 is provided in a distributor 38 which has a shaft rotatable by a crankshaft of the main body 26 of the engine, for detecting a crank angle from the rotation of the shaft to determine an engine rotary speed.

The ECT also includes a vehicle speed sensor 110, for detecting vehicle speed from the rotation speed of an output shaft thereof, a shift position sensor 112 for detecting a shift position, and a Co sensor 113 for detecting a rotary speed of clutch Co (to be described hereunder). Outputs from these sensors 100, 102, 104, 108, 110, 111, 112 and 113 are inputted to an engine computer 40 or ECT computer 50. The engine computer 40 calculates a fuel injection flowrate and the optimum ignition timing by using the input signals from the sensors as parameters, and controls the injection 22 so that an amount of fuel commensurate to said fuel injection flowrate can be injected. The engine computer 40 also controls the ignition coil 44 so that the optimum ignition timing can be obtained. Furthermore, the engine computer 40 performs the torque down of the engine by introducing a lag angle control of the ignition timing during shifting.

An idle rotation speed control valve 42 driven by a step motor is provided in a bypass passage linking the upstream side of the throttle valve 14 with the surge tank 16, whereby the idle rotation speed is controlled in response to a signal from the engine computer 40.

On the other hand, a transmission section 900 of the ECT in this embodiment includes a torque converter 910, an overdrive mechanism 920 and an underdrive (or speed reduction) mechanism 930.

The torque converter 910 includes a well-known pump 911, a turbine 912, a stator 913 and a lockup clutch 914.

The overdrive mechanism 920 includes a planetary gearing arrangement consisting of a sun gear 921, a planetary pinion 922 being in mesh with the sun gear 921, a carrier 923 supporting the planetary pinion 922 and a ring gear 924 being in mesh with the planetary pinion 922. The rotating condition of the planetary gearing arrangement is controlled by a clutch Co, a brake Bo and a one-way clutch Fo.

The underdrive (or speed reduction) mechanism 930 includes a dual planetary gearing arrangement consisting of a common sun gear 931, planetary pinions 932 and 933, which are in mesh with the sun gear 931 respectively, carriers 934 and 935, which support the planetary pinions 932 and 933 respectively, and ring gears 936 and 937, which are in mesh with the planetary pinions 932 and 933 respectively. The rotating condition of the planetary arrangement, and the connecting conditions from the overdrive mechanism are controlled by clutches C1 and C2, brakes B1-B3 and one-way clutches F1 and F2. Since the connected state of the respective component parts of this transmission 900 is well known, only the skeleton diagram is shown in FIG. 2 and detailed description is omitted.

In this embodiment, electromagnetic valves S1-S4 in a hydraulic control circuit 60 are driven and controlled in accordance with a preset shift pattern by an ECT computer which receives signals from the throttle sensor 102, the vehicle speed sensor 110 (or 111), Co sensor 113 and so forth. The ECT computer then controls the combination of the clutches, brakes and the like as shown in FIG. 3, so that the shift control can be performed.

Marks ○ in FIG. 3 indicate the operated positions. Marks ◎ indicate the operated positions only when the engine is power-on (when the engine torque is transmitted to the wheels, i.e., the engine brake does not occur).

In the above-described system, the engine computer 40 receives shift information (shift determination, shift command, lockup clutch engagement permission, and the like) from the ECT computer 50, and carries out the engine torque control (said lag angle control).

Figure 4:
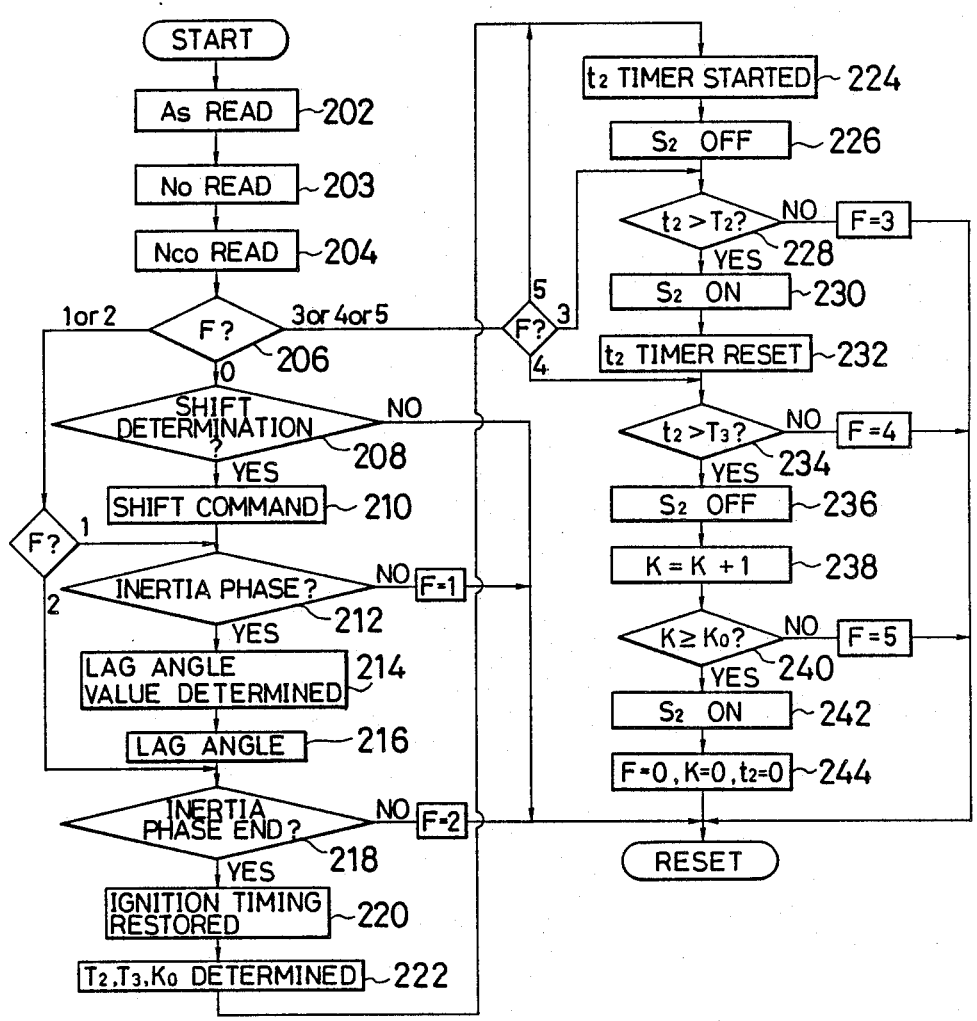
FIG. 4 is a flow chart showing the control routine.

The control flow in the system of this embodiment will be shown in FIG. 4. For the sake of simplification, 1→2 upshifting is described here.

In steps 202-204, a throttle opening As, an output shaft rotary speed (corresponding to the vehicle speed) No of the automatic transmission and a drum rotary speed NCo of the clutch Co are monitored.

A flag F in Step 206 controls the flow. Since the flag F is reset at zero initially, the routine proceeds to Step 208. In Step 208, whether or not a shift determination has been made is detected. When there has been no shift determination, the flow is reset directly. When there has been the shift determination, the routine proceeds to Step 210, where a shift command (command for turning ON the electromagnetic valve S2) for performing upshifting from the 1st gear stage to the 2nd gear stage is outputted.

After the shift command is outputted in Step 210, the routine proceeds to Step 212, where whether or not the automatic transmission has entered an inertia phase (substantial shift duration) is detected. To detect the inertia phase, whether the current engine speed becomes smaller than the preceding engine speed continuously may be determined, for example.

When the inertia phase is detected, a lag angle value (engine torque down value) is determined in Step 214, and a lag angle control is actually performed in Step 216.

This lag angle control is continued until the completion or thereabout of the inertia phase is detected in Step 218. The completion or thereabout of the inertia phase can be detected, for example, by determining whether a condition of $NCo < No \times I_H + N1$ is established or not. In this case, the constant N1 is a term of correction determined by the type of shifting, engine load and the like.

When the completion or thereabout of the inertia phase is detected, an ignition timing return is commanded in Step 220, and timer values T2 and T3, and a count constant Ko are determined in accordance with the throttle opening As and the type of shifting in Step 222.

In step 224, a timer t2 is started and the electromagnetic valve S2 is turned OFF in Step 226. As a result, a valve for switching the gear stages is temporarily returned to the preceding gear stage, whereby the oil pressure which has begun to be fed to the frictionally engaging devices is temporarily drained and lowered. Examples of the maps of the aforesaid T2, T3, N1 and Ko are shown in FIG. 5.

The OFF state of the electromagnetic valve S2 is continued by Step 228 during the timer value T2 from the timer start in Step 224. When the electromagnetic valve S2 is turned ON in Step 230, the timer t2 is instantaneously reset at zero in Step 232, and thereafter, the routine proceeds to Step 234. In Step 234, the ON state of the electromagnetic valve S2 is held during the timer value T3, and when the timer value T3 elapses, the electromagnetic valve S2 is turned OFF again (Step 236), and a counter K is incremented (Step 238).

In Step 240, whether or not the counter K has become larger than the count constant Ko is determined. Until this condition is established, Steps 224 to 238 are repeated, and, each time when this repeat is made, the number (counter K) of this repeats are counted in Step 238. When this count is completed, the final ON-operation of the electromagnetic valve S2 is performed in Step 242, and all of the flag F, counter K and timer t2 are set at zero, and thereafter, the flow is reset in Step 244.

Since, in this embodiment, the electromagnetic valve S2 is ON-OFF operated to reduce or regulate the rate of change with time of the oil pressure which has begun to be fed to the frictionally engaging devices, the same hard system of the hydraulic control devices as that in the conventional hydraulic control devices can be used.

Since, in regulating the rate of change with time, ON time duration and OFF time duration of the electromagnetic valve S2 are set in accordance with the throttle opening As and the type of shifting, the rate of change with time commensurate to the running conditions can be properly obtained.

Furthermore, a time duration during which the rate of change with time (in this embodiment, this is controlled by the count constant Ko), is determined in accordance with the throttle opening As and the type of shifting, so that the change and control can be performed only during the time duration commensurate to the running conditions.

Figure 6:
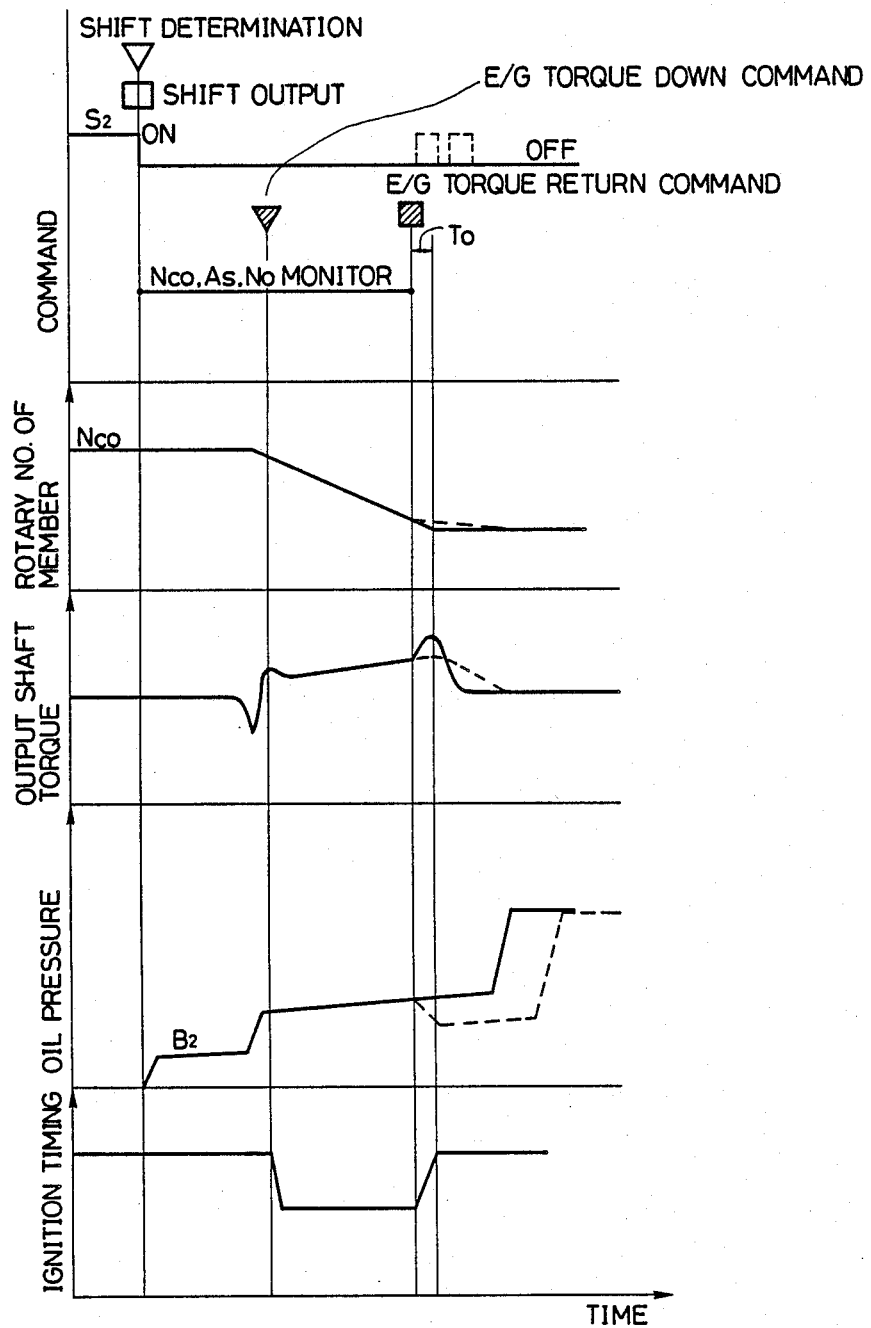
FIG. 6 is a shift transition characteristic chart qualitatively showing the effects of the first embodiment.

FIG. 6 shows the shift transition characteristics when the above-described embodiment is worked. As indicated by a broken line in the drawing, the rate of change with time of the supplied oil pressure is reduced simultaneously with the completion of the torque change, so that fluctuations in the output shaft torque can be prevented accordingly.

As an additional example of the change-control means, the case where the line oil pressure and the back pressure of the accumulator are controlled will be shown hereunder.

Figure 7:
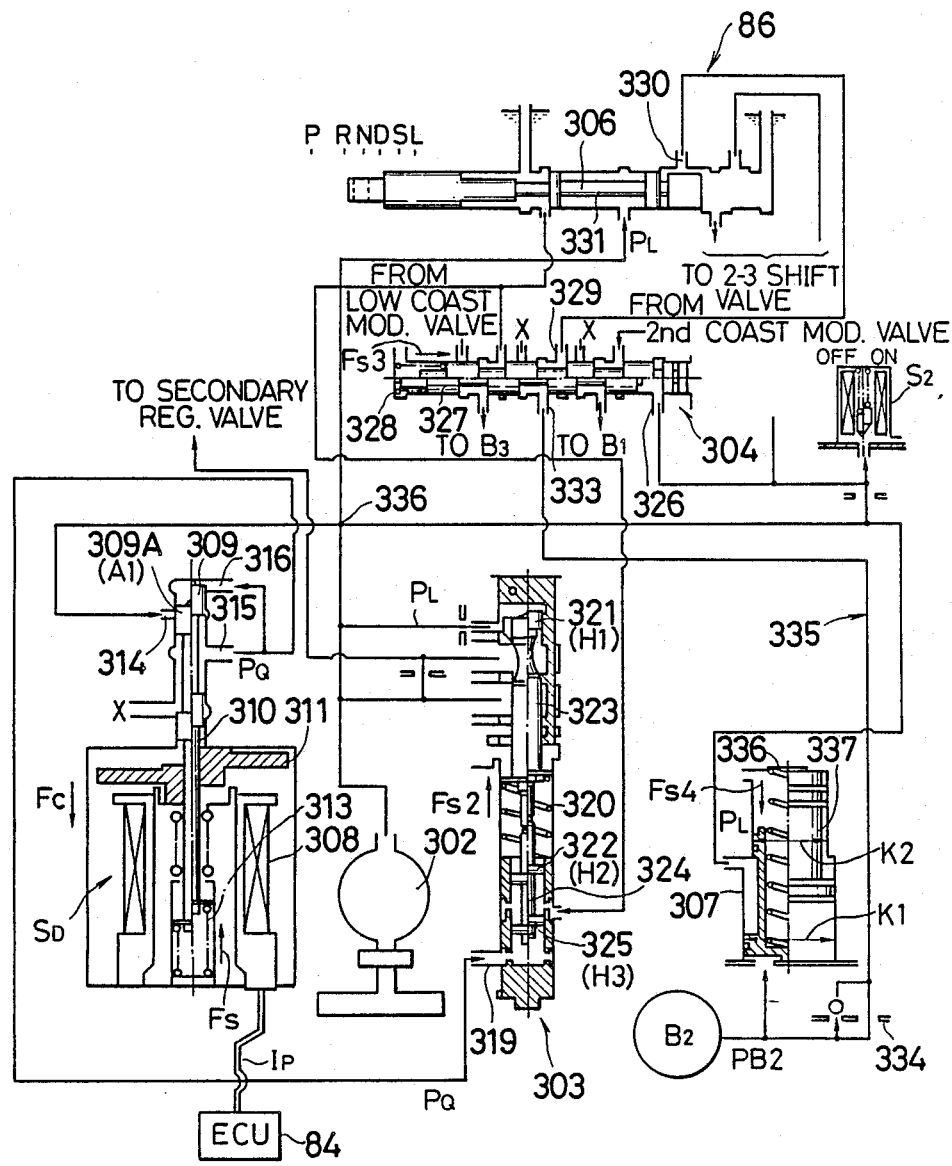
FIG. 7 is a hydraulic circuit diagram showing the essential portions of a second embodiment.
Figure 8:
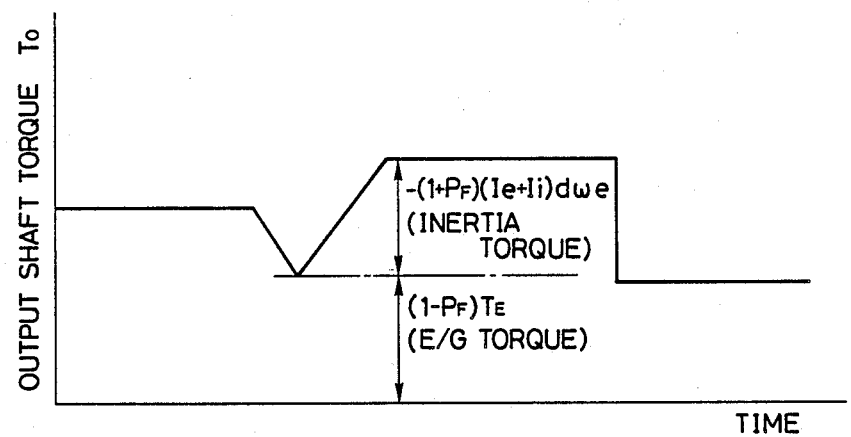
FIG. 8 is a chart qualitatively showing the arrangement of output shaft torque during shifting.

FIG. 7 shows the essential portions of the hydraulic control device.

In the drawing, denoted at SD is the electromagnetic proportion valve, at 302 is a pump, at 303 is the primary regulator valve, at 304 is a 1–2 shift valve, at S2 is the solenoid valve, at 306 is a manual valve operated by the driver and at 307 is an accumulator for controlling the transition characteristics when oil pressure is supplied to or removed from the brake B2, respectively.

The electromagnetic proportion valve SD is well known by itself and includes spools 309 and 310, coil 308, spring 313, plunger 311 and the like. The spool 310 and the plunger 311 are interconnected in the axial direction. The coil 308 applies a force Fc directed downwardly in the drawing to the plunger 311 (and the spool 310) in accordance with load current Ip from the ECU 84. In opposition to the force Fc, the spring 313 renders a force Fs to the spool 310. A discharge pressure from the pump 302 acts on a port 314. The oil pressure at ports 315 and 316 is designated PQ. PQ is derived through the following eauation (1), wherein A1 is the surface area of land 309A of spool 309.;

$$PQ = (Fs - Fc)/A1 \qquad (1).$$

As a consequence, the force Fc directed downwardly in the drawing, which is generated by the coil 308, is controlled, so that the oil pressure PQ generated at the port 315 in accordance with equation (1) can be controlled to a desired value ranging from zero to Fs/A1. Oil pressure PQ corresponds to a so-called throttle pressure which has heretofore been normally generated by a throttle valve, wherein a spool is mechanically drivable through a cam in proportion to a throttle opening. Oil pressure PQ acts on port 319 of a primary regulator valve 303 to control the line pressure. Oil pressure PQ also acts on a port 315 of a secondary regulator valve 305 to control the lubricating oil pressure.

In the primary regulator valve 303, the line pressure PL is generated in relation to the value of the control pressure PQ, as is conventional. Because the load current Ip to the coil 308 is controlled in response to a command from the ECU 84, the line pressure PL can be desirably controlled. The equation relating to the pressure regulation in the primary regulator valve 303 is as follows:

$$PL = \{Fs2 + (B2 - B3)PR + B2P\}/B1 \qquad (2);$$

herein Fs2 is the acting force of a spring 320, B1–B3 are face areas of lands 321, 322 and 325 of spools 323 and 324, and PR is the line pressure applied to the lands 322 and 325 when the manual valve 306 is in the reverse range.

The frictionally engaging devices are described below. The brake B2 will be described as typifying the frictionally engaging devices.

A signal pressure of the solenoid valve S2 acts on port 326 of the 1–2 shift valve 304. As a consequence, a spool 327 of the 1–2 shift valve 304 slides to the right and left in the drawing in accordance with the ON-OFF operation of the solenoid valve S2. Spool 327 is biased to the right due to the force Fs3 from a spring 328. When spool 321 is in the its rightward position, ports 333 and 329 in the 1–2 shift valve 304 communicate with one another. The line pressure PL from a port 130 of the manual valve 306 acts on the port 329 in the D (drive) range. More specifically, the ports 330, 329 and 333 are adapted to be connected to one another in the D range selection position of the spool 331 of the manual valve 306. The port 333 is connected to the brake B2 through an oil line 335 and a check valve 334. As a consequence, in the D range, the line pressure PL is supplied to or removed from the brake B2 in accordance with the ON-OFF operation of the solenoid valve S2.

The oil line 335 is connected with accumulator 307, whereby the transitional oil pressure level is controlled when the line pressure PL is supplied to or removed from the brake B2. The transitional oil pressure PB2, i.e., the oil pressure while the accumulator 307 is working, is derivable as a function of the line pressure PL applied as the back pressure as indicated by the following equation.

$$PB2 = Fs4 + (C1 - C2)PL/C1 \qquad (3);$$

wherein Fs4 is an acting force of a spring 336, and C1 and C2 are face areas of two lands of an accumulator piston 337.

Because the control oil pressure PQ is controlled by the load current control to the electromagnetic proportion valve SD through the above-described equations (1)-(3), the oil pressure PB2 to the brake B2 can be desirably controlled at transitional times, as well as other times.

Figure 9:
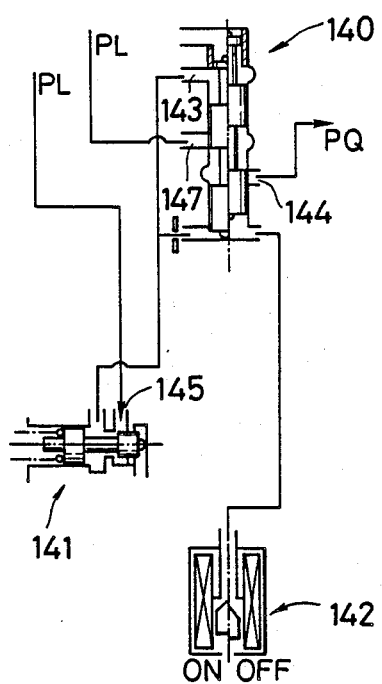
FIG. 9 is an essential part of a hydraulic circuit diagram showing another oil pressure change means.

The above embodiment, the combination of an electromagnetic proportion valve with primary regulator valve is adopted. However, as described above, the present disclosed invention is not so limited, and may encompass further control systems for controlling oil pressure. For example, as shown in the further embodiment of FIG. 9, in place of the electromagnetic proportion valve, a relief valve 141, a duty control valve 140 and a high speed solenoid valve 142 are provided. The duty ratio of the high speed solenoid valve 142 may be controlled to desirably regulate the line pressure applied to a port 147 of the duty control valve 140 with the control oil pressure PQ at a port 144. In this embodiment, a port 147 is connected to oil line point 136 shown in FIG. 7, the port 144 is connected to port 119 of the primary regulator valve 103, and further, a port 145 of the relief valve 141 is connected to the oil line point 136.

Of course, as in the first embodiment, the shift valve associated with this shifting may be temporarily returned to the side of the preceding gear stage once or a few times. With this arrangement, the supplied oil pressure to the frictionally engaging devices can be temporarily decreased without using the duty valve or the electromagnetic proportion valve.

What is claimed is:

1. A system for integrally controlling an automatic transmission and an engine, wherein a hydraulic control device is operated and engagements of frictionally engaging devices are selectively switched, to thereby achieve shifting between gear stages, and wherein a change in engine torque is controlled during said shifting, said system comprising change-control means for changing and controlling a rate of change with time of oil pressure supplied to said frictionally engaging devices, said change-control means comprising rate reducing means for temporarily reducing said rate of change with time in association with the completion of said engine torque change.

2. The system as set forth in claim 1, wherein said rate reducing means includes a timer means which outputs a command to reduce said rate of change with time of oil pressure at the same time or at a predetermined time, after a command is received corresponding to completion of said engine torque change.

3. The system as set forth in claim 2, further comprising means for detecting at least one of: type of shifting, engine load and shift pattern, wherein said predetermined time is determined in association with at least one of the type of shifting, engine load and shift pattern.

4. The system as set forth in claim 1, wherein said rate reducing means includes a timer means which outputs a command to complete said engine torque change at the same time or at a predetermined time after a command is received to reduce said rate of change with time of oil pressure.

5. The system as set forth in claim 4, further comprising means for detecting at least one of: type of shifting, engine load and shift pattern, wherein said predetermined time is determined in association with at least one of the type of shifting, engine load and shift pattern.

6. The system as set forth in claim 1, further comprising a shift valve for shifting said gear stages, wherein during a change between said gear stages said change-control means temporarily returns said shift valve to an original position at least once.

7. The system as set forth in claim 1, further comprising an accumulator with a back pressure chamber in an oil line leading to said frictionally engaging devices, wherein said change-control means changes the back pressure of said accumulator.

8. The system as set forth in claim 1, further comprising a duty valve in an oil line of line pressure of said hydraulic control devices, wherein said change-control means includes means for controlling the line pressure by said duty valve.

9. The system as set forth in claim 1, further comprising an electromagnetic proportion valve in oil line of the line pressure of said hydraulic control devices, wherein said change-control means includes means for controlling the line pressure by said electromagnetic-proportion valve.

10. The system as set forth in claim 1, further comprising a shift valve for shifting said gear stages and a duty valve, wherein said change-control means includes means for controlling oil pressure directly supplied to said frictionally engaging devices through said shift valve by said duty valve.

11. The system as set forth in claim 1, further comprising a shift valve for shifting said gear stages and an electromagnetic proportion valve, wherein said change-control means includes means for controlling oil pressure supplied to said frictionally engaging devices through said shift valve by said electromagnetic proportion valve.

* * * * *